United States Patent [19]

Schafer

[11] 4,370,463

[45] Jan. 25, 1983

[54] PROCESS FOR NO-BAKE FOUNDRY APPLICATION UTILIZING POLYURETHANES BASED ON AMINE POLYOLS

[75] Inventor: Robert J. Schafer, Worthington, Ohio

[73] Assignee: Ashland Oil, Inc., Ashland, Ky.

[21] Appl. No.: 248,165

[22] Filed: Mar. 30, 1981

Related U.S. Application Data

[63] Continuation of Ser. No. 72,730, Sep. 4, 1979, abandoned, which is a continuation of Ser. No. 915,413, Jun. 14, 1978, abandoned.

[51] Int. Cl.³ .......................... C08G 18/50; B22C 1/22
[52] U.S. Cl. ...................... 528/78; 164/526; 528/79
[58] Field of Search ............ 528/76, 78, 79; 164/526

[56] References Cited

U.S. PATENT DOCUMENTS

| | | | |
|---|---|---|---|
| 2,422,118 | 6/1947 | Meyer | 524/422 |
| 2,953,533 | 9/1960 | Khawam | 528/78 |
| 3,428,110 | 2/1969 | Walker et al. | 164/526 |
| 3,574,167 | 4/1971 | Case et al. | 528/78 |
| 3,933,727 | 1/1976 | Schmid | 528/76 |
| 4,079,031 | 3/1978 | Sardessai et al. | 260/37 N |
| 4,293,480 | 10/1981 | Martin et al. | 260/38 |

FOREIGN PATENT DOCUMENTS

| | | | |
|---|---|---|---|
| 865741 | 7/1978 | Belgium . | |
| 4739452 | of 1968 | Japan . | |
| 55-153647 | 11/1980 | Japan | 164/526 |

OTHER PUBLICATIONS

"Unofficial" (uncertified) Translation of Japanese Patent Specification 49-10569, (Mar. 12, 1974), Aoki et al., Assignors to Hodogaya Chem. Co., Tokyo.

Primary Examiner—H. S. Cockeram
Attorney, Agent, or Firm—Vernon F. Venne

[57] ABSTRACT

No Bake foundry cores and molds for casting metals are prepared by using a binder comprising a polyol generally derived from alkoxylating an amine compound and a polyisocyanate. The binder is especially useful for casting non-ferrous metals, for example, the casting of aluminum, magnesium and other light weight metals. The cores and molds produced for casting aluminum and other light weight metals exhibit excellent shakeout while retaining other desirable core and mold properties. In addition the binders of this invention would have been observed to have an autocatalytic nature.

27 Claims, No Drawings

PROCESS FOR NO-BAKE FOUNDRY APPLICATION UTILIZING POLYURETHANES BASED ON AMINE POLYOLS

This is a continuation of Ser. No. 072,730 filed Sept. 4, 1979 which Ser. No. 072,730 was a continuation of Ser. No. 915,413 filed June 14, 1978, both now abandoned.

BACKGROUND OF THE INVENTION

This invention relates to resinous binder compositions which are admixtures of amine-based polyols and polyisocyanates. In another aspect this invention relates to curable urethane binder compositions which are useful for binding particulate solids. In particular the invention relates to binders, of the No Bake type, which utilize an amine polyol. The binders are capable of bonding sand or other foundry aggregate to form molds or cores for casting of metals, especially aluminum and other light weight metals which are cast at relatively low temperature. The cores and molds made using these binders demonstrate superior collapsibility when used at low casting temperatures.

DESCRIPTION OF THE PRIOR ART

Urethane No Bake binders for use in bonding aggregates useful as foundry cores and molds are known in the art. U.S. Pat. No. 3,676,392 is an example of such a No Bake binder composition and the use thereof to make cores and molds for foundry applications.

This invention is based in part upon the autocatalytic nature of amine polyols. A No Bake binder system for use in foundries is now disclosed which can be a two component system instead of a typical urethane No Bake System which utilizes at least three components.

Although the autocatalytic nature is a significant advancement, this invention is not limited to such a system but may also incorporate a catalyst in certain embodiments. It is believed that utilization of an amine polyol in a No Bake System is in itself an advancement in the art of foundry binders.

This invention also embodies another very important feature. A long felt need in the foundry industry has been a No Bake binder for making castings for light metals such as aluminum and magnesium. The No Bake binders of the prior art were unable to provide cores and molds for casting these light weight metals having the required core and mold properties as well as good shakeout. Urethane No Bake binders based on phenolic, alkyd-oil and polyester polyols are common in the foundry industry. However, when enough binder is used to achieve workable strength and abrasion resistance the cores and molds will not break down well at the casting temperatures of light metals. That is, they exhibited poor shakeout. Non-urethane No Bake binders based on furan resins, phenolic resins, alkyd resins, phosphate polymers and sodium silicates are also known and used, but suffer from the same shakeout problem as described for the urethane No Bake binders. Therefore, an existing problem has been to find a binder that on the one hand produces strong, non-friable cores and molds and on the other hand breaks down well at the casting temperature of aluminum and magnesium to provide easy shakeout.

BRIEF SUMMARY OF THE INVENTION

It is an object of this invention to provide a foundry binder composition using in admixture a polyol and a polyisocyanate, wherein the polyol is an amine polyol. The amine polyols of this invention are normally obtained as the reaction product of an amine and an alkylene oxide.

Another object of this invention is to provide urethane No Bake binder compositions. It is further an object of this invention to provide urethane No Bake binders which can be used to produce cores and molds which have strength and non-friability but still break down well at low casting temperatures, i.e., below the casting temperatures of ferrous metals. The cores and molds exhibit the combination of strength and easy shakeout at the casting temperatures of light weight metals such as aluminum and magnesium.

It has been found that a urethane binder formed as the reaction product of a polymeric isocyanate and an amine-based polyol can be used to make cores and molds. More specifically it has been found that a polyol which is the reaction product of an amine compound and an alkylene oxide will react with a polymeric isocyanate to produce a No Bake binder which, upon mixing with sand or other suitable foundry aggregates, forms cores and molds possessing excellent working characteristics, i.e., strength, abrasion resistance and non-friability. These properties are coupled with excellent shakeout characteristics when used in casting nonferrous metals. This combination of good working characteristics and excellent shakeout are especially significant and unique when the binder is used to make cores intended for use in low temperature casting. A catalyst is not necessarily a component of the binder system. However, suitable catalysts can be utilized in the invention and are preferred with certain amine polyols when a rapid cure is needed.

DETAILED DESCRIPTION OF THE INVENTION

The resin compositions of the present invention find use as a two-part composition or system. Part one is the amine polyol. Part two is the polyisocyanate. Both parts are in liquid form and are generally solutions with organic solvents. At the time of use, that is to say when the urethane binder is formed, the amine polyol part and the polyisocyanate part are combined and used for the intended application. In foundry application, i.e., the use of the compositions as a binder for cores and molds, it is preferred to first admix one part with a foundry aggregate such as sand. Thereafter, the second component is added and after achieving a uniform distribution of binder on the aggregate, the resulting foundry mix is formed or shaped into the desired shape. The shaped product can immediately be set aside and will cure to form a core or mold at room temperature. The compositions of this invention are generally autocatalytic to a degree. That is, once the amine polyol and isocyanate are combined the reactivity of the polyol with the isocyanate is such that the reaction proceeds rapidly enough that a catalyst is not needed. The degree of reactivity of the amine polyol and polyisocyanate is dependent upon the reactivity of the polyol.

In spite of the fact that the compositions are autocatalytic, amine catalysts and metallic catalysts known in urethane technology may be employed. It should be noted that in some cases the use of a catalyst with the amine polyol and polyisocyanate components is beneficial and preferred. By selection of a proper catalyst, conditions of the core making process, for example work time and strip time, can be adjusted as desired. In commercial practice it may be necessary to use a catalyst with certain polyols to obtain desired production rates.

The amine polyols used to form the urethane binder compositions of this invention are normally produced as the reaction product of an alkylene oxide and an amine compound. When the term "amine polyol" is used herein it is meant to identify such reaction products but is not limited specifically to such means of synthesis. In general any polyol containing at least one or more tertiary amine groups are considered to be within the scope of the definition of "amine polyol". The alkylene oxides which are used to prepare the amine polyols are preferably ethylene oxide and propylene oxide. However, it appears feasible to use other alkylene oxides as well. The amount of alkylene oxide in moles to moles of amine compound is subject to considerable variation. It is believed that the degree of alkoxylation does not detract from the ability of the resultant amine polyol to function as a binder.

The amine compounds which react with alkylene oxides to yield the amine polyols useful in the binder composition constituting this invention include ammonia and mono and polyamino compounds with primary or secondary amino nitrogens. Specific examples include aliphatic amines such as primary alkyl amines, ethylene diamine, diethylene triamine and triethylene tetramine, cycloaliphatic amines, aromatic amines, such as ortho-, meta- and para-phenylene diamines, aniline-formaldehyde resins and the like. Blends of the amine polyols listed above can also be utilized. In addition a blend of amine polyols with other polyols is useful. In general it is believed that amine containing compounds which when alkoxylated yield a polyol with two or more reactive hydroxyl groups are useful in the compositions of this invention.

The second component or package of the novel binder composition comprises an aliphatic, cycloaliphatic, or aromatic polyisocyanate having preferably from 2 to 5 isocyanate groups. If desired, mixtures of polyisocyanates can be employed. Isocyanate prepolymers formed by reacting excess polyisocyanate with polyhydric alcohol e.g. a prepolymer of toluene diisocyanate and ethylene glycol, also can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2, 4-diisocyanate, and the like. Although all polyisocyanates react with the amine polyol to form a crosslinked polymer structure, the preferred polyisocyanates are aromatic polyisocyanates and particularly diphenylmethane diisocyanate, triphenylmethane triisocyanate, and mixtures thereof.

The polyisocyanate is generally employed in approximately a stoichiometric amount, that is in sufficient concentration to cause the curing of the amine polyol. However, it is possible to deviate from this amount within limits and in some cases advantages may result. In general, the polyisocyanate will be employed in a range of 10 to 500 weight percent based on the weight of the amine polyol. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

Although the solvent employed in combination with either the amine polyol or the polyisocyanate or for both components does not enter to any significant degree into the reaction between the isocyanate and the amine polyol, it can affect the reaction. Thus the difference in the polarity between the polyisocyanate and the amine polyol restricts the choice of solvents in which both components are compatible. Such compatibility is necessary to achieve complete reaction and curing of the binder compositions of the present invention. Polar solvents of either the protic or aprotic type are good solvents for the amine polyol. It is therefore preferred to employ solvents or combinations of solvents where the solvent(s) for the polyol and for the polyisocyanate when mixed are compatible. In addition to compatibility the solvents for either the polyol or polyisocyanate are selected to provide low viscosity, low odor, high boiling point and inertness. Examples of such solvents are benzene, toluene, xylene, ethylbenzene, and mixtures thereof. Preferred aromatic solvents are solvents and mixtures thereof that have a high aromatic convent and a boiling point range within a range of 280° to 500° F. The polar solvents should not be extremely polar such as to become incompatible when used in combination with the aromatic solvent. Suitable polar solvents are generally those which have been classified in the art as coupling solvents and include furfural, Cellosolve, glycol diacetate, butyl Cellosolve, acetate, isophorone and the like. It is possible some reactive polyols may also be used as a solvent. In addition it should be noted that water has been found to be a suitable solvent for the amine polyol under certain conditions.

The binder components are combined and then admixed with sand or a similar foundry aggregate to form the foundry mix or the foundry mix can also be formed by sequentially admixing the components with the aggregate. Methods of distributing the binder on the aggregate particles are well-known to those skilled in the art. The foundry mix can, optionally, contain other ingredients such as iron oxide, ground flax fibers, wood cereals, pitch, refractory flours, and the like. The aggregate, e.g. sand, is usually the major constituent and the binder portion constitutes a relatively minor amount. Although the sand employed is preferably dry sand, some moisture can be tolerated. This is particularly true if the solvent employed is non-water-miscible or if an excess of the polyisocyanate necessary for curing is employed, since such excess polyisocyanate will react with the water which as previously mentioned has been found to be a solvent for some amine polyols.

As previously stated the excellent shakeout or collapsibility of cores made using the binder of this invention is deemed to be a significant discovery. The binders of this invention degrade or break down easily to permit separation of the core from the cast metal. For castings at low temperatures, e.g. 1800° F. or below, shakeout has been a major problem. Generally nonferrous metals are cast at these temperatures including aluminum and magnesium. Failure of the binder to break down causes great difficulty in removal of the sand from the casting. Thus cores exhibiting a low degree of shakeout or collapsibility, that is to say a low degree of binder degradation, require more time and energy to remove the sand from the casting. The use of the binder compositions of this invention results in many cases of virtually 100% shakeout without the application of any external energy. The improvement in shakeout is attributable to the presence of the amine polyol in the binder composition. As will be appreciated by those skilled in the art, the ability of any core to shakeout is dependent to an extent upon the amount of binder used to bond the sand particles into a coherent shape.

The percent binder utilized based on the weight of the sand, depends upon the desired core properties which are required from the binder system. As can be appreciated, as the amount of binder in the system increases an increase in the tensile strength of the core generally occurs. Accordingly, the binder level may be varied within reasonable limits to achieve the described performance properties. A preferred range of binder is, in this invention, from 0.7% to 2.5% based upon the weight of sand. However, it may be possible to use as little as 0.5% and as much as 10% binder and still achieve properties which are of advantage in certain applications. However, it has also been noted that when the binder level is increased the degree of shakeout may decrease at the higher binder levels.

The present invention is further illustrated by the following examples in which, unless otherwise indicated, all parts are by weight and all percentages are weight percentages.

EXAMPLE 1

An amine polyol was prepared by propoxylating 1.0 mole of ethylene diamine with 4.2 moles of propylene oxide. A 40% solids solution of the amine polyol was prepared by dissolving the polyol in an aromatic solvent commercially available under the brand name HI-SOL ® 10. The solution is referred to as Part I. A polymeric isocyanate solution, 75% solids, based on Mondur MR, commercially available from Mobay, was produced using an aromatic solvent, also HISOL ® 10. The isocyanate solution is referred to as Part II.

Wedron 5010 sand (washed and dried, fine grained silica sand, AFSGFN 66) was placed in a suitable mixing apparatus. Part I was admixed with the sand until a uniform coating was provided. Part II was added to the coated sand and blended until a homogeneous sand mix was prepared. A near stoichiometric amount of polyisocyanate, a slight excess, to completely react with the hydroxyl groups of the polyol was used. One an a half percent (1½%) of total binder (equal amounts of Part I and II) by weight of sand was used.

The mix of sand, polyol and polyisocyanate was placed in a core box and standard tensile briquettes, known as "dog bones", were prepared. A work time of five and a half minutes and a strip time of eight minutes was achieved. Tensile strengths after two hours, four hours and 24 hours were 300, 371 and 387 psi, respectively.

The "dog bone" cores were used in shakeout studies with aluminum castings. Seven tensile briquettes (dog bones) were arranged in a mold. The mold incorporated a gating system. The mold is designed to provide hollow castings having a metal thickness of approximately one-quarter inch on all sides. An opening at an end of the casting is provided for removal of the core from the casting. Molten aluminum at approximately 1300° F. prepared from aluminum ingots was poured into the mold. After cooling for about an hour the aluminum castings are broken from the gating system and removed from the mold for shakeout testing.

Shakeout tests are performed by placing a casting in a one gallon container. The container is placed on an agitating mechanism and tumbled for two minutes. The weight of the sand core which is removed from the casting in this manner is compared to the initial weight of sand core and a percent shakeout is calculated. Sand remaining in the casting after the agitation described above is removed by scraping and also weighed. The sand core, bonded with the amine polyol-polyisocyanate binder described above, collapsed and flowed out of the aluminum casting without using the agitation mechanism and without the application of any external mechanical energy. Shakeout was 100%.

EXAMPLES 2–6

Using the procedures described in Example 1 dog bone test cores were prepared using the components and methods listed and described below. The cores were used in shakeout tests using aluminum castings as described in Example 1.

|  | Example 2 | Example 3 | Example 4 | Example 5 | Example 6 |
| --- | --- | --- | --- | --- | --- |
| Sand | Wedron 5010 | Wedron 5010 | Wedron 5010 | Wedron 5010 | Wedron 5010 |
| Amine compound | Diethylene Triamine |  | Triethylene Tetramine | Ethylene Diamine |  |
| Alkylene Oxide (AO) | Propylene Oxide |  | Propylene Oxide | Propylene Oxide |  |
| Mole Ratio AO:amine | 5.1:1 |  | 6.2:1 | 12:1 |  |
| Amine Polyol |  | Triethanolamine from UPJOHN[a] |  |  | QUADROL[b] |
| Polyisocyanate | Mondur MR | Mondur MR | Mondur MR | Mondur MR | Mondur MR |
| Solvent in Amine Polyol | 40% HISOL 10 | 10% ISOPHORONE | 60% ISOPHORONE | 60% HISOL 10 | 60% HISOL 10 |
| Solvent in Polyisocyanate | NONE | NONE | 25% HISOL 10 | 25% HISOL 10 | 25% HISOL 10 |
| Catalyst | NONE | NONE | NONE | NONE | NONE |
| Work Time | 5 min. | 2 min. | 0.5 min. | 6 min. | 5 min. |
| Strip Time | 12 min. | 4.5 min. | 1.0 min. | 9 min. | 8 min. |
| Percent | 1.5% | 1.5% | 1.5% | 1.5% | 1.5% |

|  | Example 2 | Example 3 | Example 4 | Example 5 | Example 6 |
|---|---|---|---|---|---|
| Binder |  |  |  |  |  |
|  | 40% Part I | 50% Part I | 50% Part I | 50% Part I | 50% Part I |
|  | 60% Part II | 50% Part II | 50% Part II | 50% Part II | 50% Part II |
| Tensile Strength in psi |  |  |  |  |  |
| 2 hr. | 100 | 153 | 85 | 360 | 339 |
| 4 hr. | 118 | 210 | 113 | 365 | 350 |
| 24 hr. | 163 | 247 | — | 230 | 383 |
| Shakeout | 100% | 100% | 100% | 100% | 100% |

[a]UPJOHN is a brand of triethanolamine, i.e. ethoxylated ammonia, commercially available from Upjohn Corp.
[b]QUADROL is the brand of propoxylated ethylene diamine, mole ratio of 4:1, commercially available from BASF Wyandotte.

Cores made as described above were observed to collapse and flow out of the casting without using an agitation mechanism and without the application of any external mechanical energy.

EXAMPLE 7

An aromatic amine polyol was prepared by propoxylating one mole of meta-phenylenediamine with 4.2 moles of propylene oxide. A 40% solids solution of the aromatic amine polyol was prepared by dissolving the polyol in an aliphatic solvent, butyl Cellosolve. This solution is referred to as Part I. A polymeric isocyanate solution, 75% solids, based on Mondur MR, commercially available from Mobay, was prepared using an aromatic solvent, commercially available as HISOL ® 10. The isocyanate solution is referred to as Part II. A nearly stoichiometric amount of polyisocyanate to completely react with the hydroxyl groups of the polyol was used.

Wedron 5010 sand (washed and dried, fine grained silica sand, AFSGFN 66) was placed in a suitable mixing apparatus. Part I was admixed with the sand until a uniform coating was provided. Incorporated in Part I was a urethane catalyst, triethylenediamine, commercially available under the brand name DABCO. This catalyst is a well known urethane catalyst. Based on the weight of Part I, 0.8% catalyst was used. Part II was added to the coated sand and blended until a homogeneous sand mix was prepared. One and a half percent (1½%) of total binder (Part I and Part II) by weight of sand was used.

The mix of sand, polyol, catalyst and polyisocyanate was placed in a core box and standard tensile briquettes, known as "dog bones", were prepared. A work time of seventy minutes and a strip time of one hundred ten minutes was achieved. Tensile strength after 24 hours was 230 psi.

The "dog bone" cores were used in shakeout studies as described in Example 1. Shakeout was 100%.

EXAMPLE 8-11

Using the procedures described in Example 7 dog bone test cores were prepared using the components and methods as described below. The cores were used in shakeout tests using aluminum castings as described in Example 7.

|  | Example 8 | Example 9 | Example 10 | Example 11 |
|---|---|---|---|---|
| Sand | Wedron 5010 | Wedron 5010 | Wedron 5010 | Wedron 5010 |
| Amine Component |  |  |  |  |
| Alkylene Oxide |  |  |  |  |
| Mole Ratio AO:amine |  |  |  |  |
| Amine Polyol | Pluracol[c] 767 | Pluracol[c] 767 | Pluracol[d] 795 | Pluracol[d] 795 |
| Polyisocyanate | Mondur MR | Mondur MR | Mondur MR | Mondur MR |
| Solvent in Amine Polyol | 40% HISOL 10 | 35% Water | 35% HISOL 10 | 35% HISOL 10 |
| Solvent in Polyisocyanate | 44%[e] | None | 35%[e] | 35%[e] |
| Catalyst (1) | 1.4% | None | None | (1) 11% |
| Work Time | 25 min. | 10 min. | 11.5 min. | 7 min. |
| Strip Time | 31 min. | 16 min. | 16 min. | 10.5 min. |
| Percent Binder | 1.5% | 1.7% | 1.5% | 1.5% |
|  | 50% Part I | 60% Part I | 50% Part I | 50% Part I |
|  | 50% Part II | 40% Part II | 50% Part II | 50% Part II |
| Tensile Strength in psi |  |  |  |  |
| 2 hr. | 225 | 108 | 203 | 223 (3 hrs.) |
| 4 hr. | — | 128 (3 hr) | 213 | 210 |
| 24 hr. | 368 | — | 323 | 320 |
| Shakeout | 92% |  | 100% | 100% |

(1) 50% phenylpropyl pyridine and 50% of a lithium salt of a carboxylic acid.
[c]Pluracol 767 is a brand name for a propoxylated aromatic amine-based polyol commercially available from BASF Wyandotte.
[d]Pluracol 795 is a brand name for an ethoxylated aromatic amine-based polyol commercially available from BASF Wyandotte.
[e]a blend of HISOL 10 and kerosene.

Cores made as described above were observed to collapse and flow out of the casting without using an agitation mechanism and without the application of any external mechanical energy.

EXAMPLE 12

An aromatic amine polyol was prepared by propoxylating one mole of ortho-polylenediamine with 4.2 moles of propylene oxide. A 40% solids solution of the aromatic amine polyol was prepared by dissolving the polyol in isophorone. This solution is referred to as Part I. A polymeric isocyanate, Mondur MR, is referred to as Part II. A nearly stoichiometric amount of polyisocyanate to completely react with the hydroxyl groups of the polyol was used.

Wedron 5010 sand (washed and dried, fine grained silica sand, AFSGFN 66) was placed in a suitable mixing apparatus. Part I was admixed with the sand until a uniform coating was provided. Incorporated in Part I was a 33% solution in dipropylene glycol of a urethane catalyst, triethylenediamine, commercially available under the brand name DABCO. This catalyst is a well-known urethane catalyst. Based on the weight of Part I, 1.0% catalyst was used. Part II was added to the coated sand and blended until a homogeneous sand mix was prepared. One and a half percent (1½%) of total binder (55% Part I and 45% Part II) by weight of sand was used.

The mix of sand, polyol, catalyst and polyisocyanate was placed in a core box and standard tensile briquettes, known as "dog bones", were prepared. A work time of nine minutes and a strip time of twenty minutes was achieved. Tensile strength of psi after 2 hours and 24 hours were 292 and 313, respectively.

The "dog bone" cores were used in shakeout studies as described in Example 1. Shakeout was 100%.

EXAMPLES 13–15

Using the procedures described in Example 12 dog bone test cores were prepared using the components and methods as described below. The cores were used in shakeout tests using aluminum castings as described in Example 12.

|  | Example 13 | Example 14 | Example 15 |
|---|---|---|---|
| Sand | Wedron 5010 | Wedron 5010 | Wedron 5010 |
| Amine Component | Meta phenylene diamine | CURITHANE[103] an anile formaldehyde resin from Upjohn | Anile |
| Alkylene Oxide | Propylene oxide | Propylene oxide | Propylene oxide |
| Mole Ratio AO:amine Amine Polyol | 4.2:1 | 4.2:1 | 2.2:1 |
| Polyisocyanate | Mondur MR | Mondur MR | Mondur MR |
| Solvent in Amine Polyol | 60% Isophorone | 60% Isophorone | 60% (X) |
| Solvent in Polyisocyanate | None | None | None |
| Catalyst | None | None | 1% Babco |
| Work Time | 45 min. | 70 min. | 70 min. |
| Strip Time | 78 min. | 101 min. | 140 min. |
| Percent Binder | 1.5% | 1.5% | 1.5% |
|  | 55% Part I | 73% Part I | 61% Part I |
|  | 45% Part II | 27% Part II | 39% Part II |
| Tensile Strength in psi: |  |  |  |
| 2 hr. | 145 | 23 |  |
| 4 hr. | 307 |  |  |
| 24 hr. | 320 | 140 | 180 |
| Shakeout | 89% | 100% | 74% |

(X) a blend of butyl cellosolve acetate (40%) and HISOL 10 (20%)

Cores made as described above were observed to collapse and flow out of the casting using an agitation mechanism, with the application of external mechanical energy.

What is claimed is:
1. Process for casting lightweight metals comprising:
   (a) Forming a foundry mix said mix comprising an aggregate, a polyisocyanate and an amine polyol wherein the aggregate comprises at least 90% by weight of said mix;
   (b) Shaping said mix to form a foundry shape;
   (c) Allowing said mix to cure after said shape has been formed;
   (d) Forming a shaped lightweight metal casting by using said cured shaped mix and by casting melted light weight metal into contact with said cured shaped mix; and
   (e) Removing the cured shaped mix from said light weight metal casting;
2. The process of claim 1 wherein the amine polyol comprises an reaction product of an amine compound and an alkylene oxide.
3. The process of claim 1 wherein the aggregate is sand.
4. The process of claim 2 wherein the amine compound is ammonia.
5. The process of claim 2 wherein the amine compound is an aromatic amine.
6. The process of claim 2 wherein the amine compound is an aliphatic amine.
7. The process of claim 2 wherein the alkylene oxide is propylene oxide.
8. The process of claim 2 wherein the alkylene oxide is ethylene oxide.
9. The process of claim 1 wherein the polyisocyanate is present as a solution of an organic solvent.
10. The process of claim 1 wherein the amine polyol is present as a solution of an organic solvent.
11. The process of claim 1 wherein the amine polyol is present as a solution of water.
12. The process of claim 1 wherein the casting of light weight metal is done at a temperature below 2000° F.
13. Process for casting light weight metals comprising:
   (a) Forming a mix said mix comprising an aggregate, a polyisocyanate and polyol wherein said aggregate comprises at least 90% by weight of said mix and wherein said polyol consists essentially of an amine polyol;
   (b) Shaping said mix to form a foundry shape.
   (c) Allowing said mix to cure after said shape has been formed;
   (d) Forming a shaped light weight casting by using said cured shaped mix and by casting melted light weight metal into contact with said cured shaped mix; and
   (e) Removing the cured shaped mix from said light weight metal casting.
14. The process of claim 13 wherein the amine polyol comprises an reaction product of an amine compound and an alkylene oxide.

15. The process of claim 13 wherein the aggregate is sand.

16. The process of claim 14 wherein the amine compound is ammonia.

17. The process of claim 14 wherein the amine compound is an aromatic amine.

18. The process of claim 14 wherein the amine compound is an aliphatic amine.

19. The process of claim 14 wherein the alkylene oxide is propylene oxide.

20. The process of claim 14 wherein the alkylene oxide is ethylene oxide.

21. The process of claim 13 wherein the polyisocyanate is present as a solution of an organic solvent.

22. The process of claim 13 wherein the amine polyol is present as a solution of an organic solvent.

23. The process of claim 13 wherein the amine polyol is present as a solution of water.

24. The process of claim 13 wherein the casting of light weight metal is done at a temperature below 2000° F.

25. The process of claim 13 where the polyol consists essentially of an amine polyol and a phenolic resin.

26. The process of claim 13 wherein the polyol comprises an amine polyol and a non-aromatic hydroxy compound.

27. The process of claim 13 wherein the light weight metal cast is aluminum.

* * * * *